(12) United States Patent
Matsuda et al.

(10) Patent No.: US 11,606,469 B2
(45) Date of Patent: Mar. 14, 2023

(54) IMAGE PROCESSING SYSTEM THAT COMPUTERIZES DOCUMENT, CONTROL METHOD THEREOF, AND STORAGE MEDIUM

(71) Applicant: Canon Kabushiki Kaisha, Tokyo (JP)

(72) Inventors: Kotaro Matsuda, Kanagawa (JP); Koji Niwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/545,339

(22) Filed: Dec. 8, 2021

(65) Prior Publication Data

US 2022/0103696 A1 Mar. 31, 2022

Related U.S. Application Data

(63) Continuation of application No. 17/153,075, filed on Jan. 20, 2021, now Pat. No. 11,228,687.

(30) Foreign Application Priority Data

Jan. 21, 2020 (JP) .............................. JP2020-007518
Feb. 27, 2020 (JP) .............................. JP2020-031689

(51) Int. Cl.
*H04N 1/00* (2006.01)

(52) U.S. Cl.
CPC ......... *H04N 1/0044* (2013.01); *H04N 1/0049* (2013.01); *H04N 1/00482* (2013.01)

(58) Field of Classification Search
CPC ............. H04N 1/0044; H04N 1/00482; H04N 1/0049; H04N 1/00413; H04N 1/62; H04N 1/00331; H04N 2201/3256; H04N 1/00461; H04N 1/32101; H04N 1/32309; G06K 9/00449; G06K 9/00442; G06F 3/04895

See application file for complete search history.

(56) References Cited

U.S. PATENT DOCUMENTS

| | | | |
|---|---|---|---|
| 2007/0220424 A1* | 9/2007 | Shaw | G06F 40/166 715/764 |
| 2013/0321837 A1* | 12/2013 | Takai | G06K 15/005 358/1.13 |
| 2019/0197303 A1* | 6/2019 | Kanada | G06V 10/768 |
| 2019/0384551 A1* | 12/2019 | Miyasaka | G06F 3/1256 |
| 2020/0068095 A1* | 2/2020 | Nabetani | H04N 1/6011 |
| 2020/0081811 A1 | 3/2020 | Matsuda | |

FOREIGN PATENT DOCUMENTS

JP 2019-115011 A 7/2019

* cited by examiner

*Primary Examiner* — Iriana Cruz
(74) *Attorney, Agent, or Firm* — Venable LLP

(57) ABSTRACT

To make it easy for a user to grasp with which text block within a preview pane, a setting item within a property pane is associated. By using a color allocated to a setting item displayed in the property pane, at least a part of a display field corresponding to the setting item is colored. Then, in a case where a user selects one of text blocks in a scanned image preview-displayed in the preview pane in the state where one of setting item is selected in the property pane, the text block is colored by using a color allocated to the setting item in the selected state.

15 Claims, 15 Drawing Sheets

Preview

Please select any setting items first in Property pane.

PURCHASE ORDER

Company Name XYZ Corporation
Address: 1 Pumpkin Road, New York, NY
Phone: (123)456-7890

Total Quantity: 25
Total Price($): 2,150.00

401
402

Metadata
Customer Name — Please select an OCR region.
Address — Please select an OCR region.
Billing Name — Please select an OCR region.

Cancel    Register

START POINT COORDINATES
421 PURCHASE ORDER
423 XYZ Corporation
422 Company Name (0,0) x / y

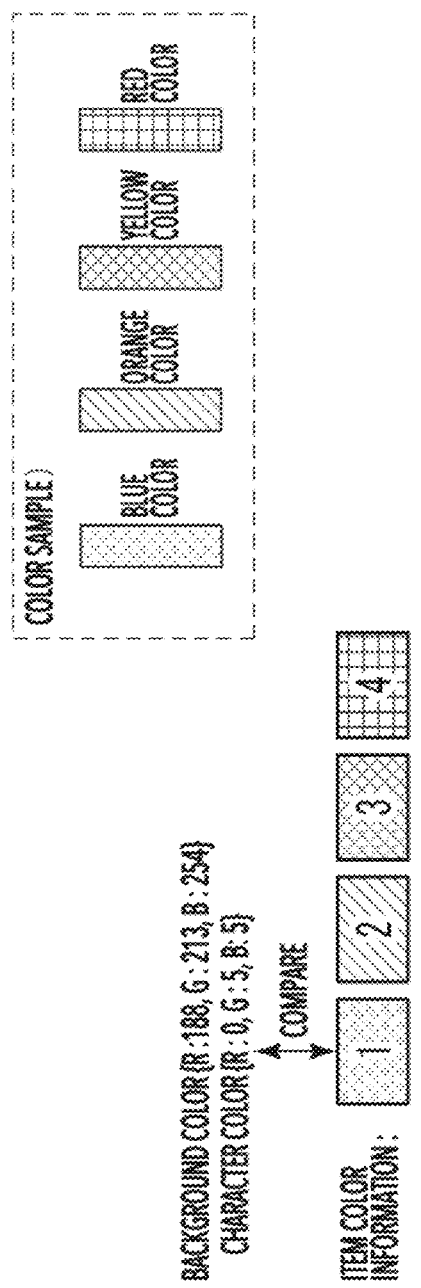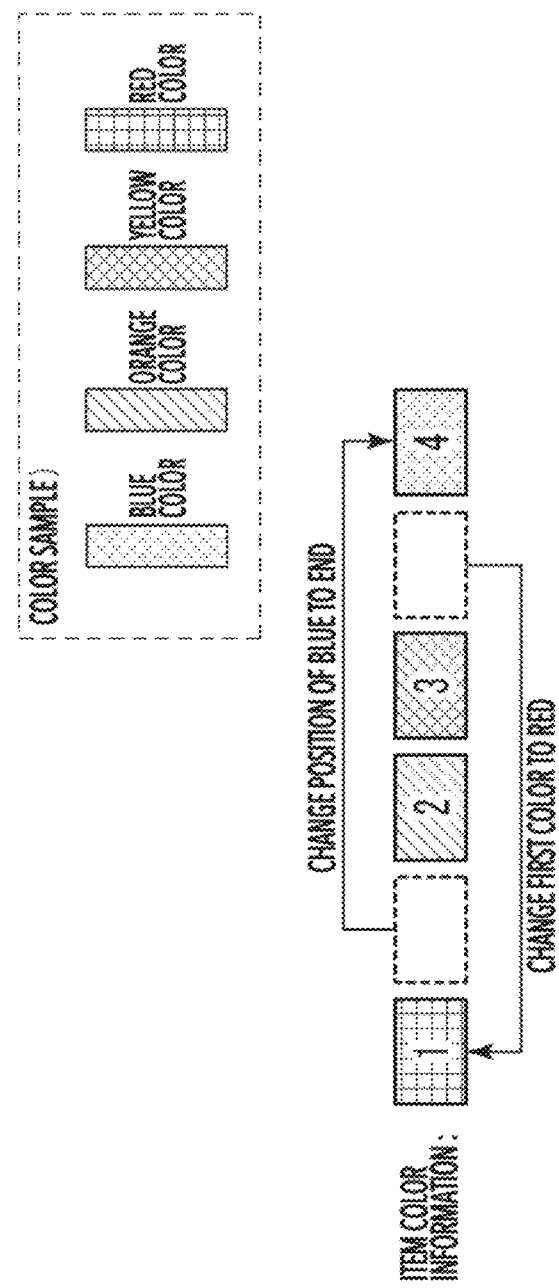
FIG.10A
FIG.10B

IMAGE PROCESSING SYSTEM THAT COMPUTERIZES DOCUMENT, CONTROL METHOD THEREOF, AND STORAGE MEDIUM

CROSS-REFERENCE TO RELATED APPLICATIONS

The present application is a Continuation Application of U.S. patent application Ser. No. 17/153,075, filed on Jan. 20, 2021, and which claims the benefit of Japanese Patent Application No. 2020-007518, filed on Jan. 21, 2020, and Japanese Patent Application No. 2020-031689, filed on Feb. 27, 2020, the entire disclosures of which are all hereby incorporated by reference herein.

BACKGROUND

Field

The present disclosure relates to a graphical user interface (GUI) at the time of computerizing a document and making use of the computerized document.

Description of the Related Art

Conventionally, it has been performed to extract a character string by performing optical character recognition processing (OCR processing) for a scanned image obtained by scanning a business form, such as an order sheet, and make use of the character string as a file name or the like. Japanese Patent Laid-Open No. 2019-115011 has disclosed a technique to automatically generate a file name by extracting a character string including a specific key from character strings included within a document image and present the file name to a user along with a preview display of the document image. With this technique, it is possible for a user to easily set a file name while checking the document image. Then, it is also performed to save and manage a character string extracted from a scanned image as metadata and make use of the metadata as a file name or the like.

As the configuration of a UI screen of an application at the time of setting a file name or metadata by using a recognized character string obtained by OCR processing, a two-pane configuration including a preview pane and a property pane is well known. Here, the preview pane is an area for preview-displaying a computerization-target scanned image and the property pane is an area for displaying contents of a property, such as a file name and metadata, in a list. In a case where a document, such as an order sheet or a bill, is computerized, a plurality of character areas (text blocks) is included in the scanned image and it is possible for a user to visually recognize each text block by the preview pane. Further, by the property pane, it is possible for a user to check the contents of a variety of setting items, such as "Customer Name", "Date", and "Address". For example, it is assumed that a user selects a text block of "XYZ Corporation" within the preview pane for a setting item of "Customer Name" within the property pane on the above-described two-pane configuration UI screen. As a result of that, the recognized character string "XYZ Corporation" within the scanned image is saved in association with the setting item "Customer Name". In this case, on a condition that a plurality of text blocks exists within the preview pane and a plurality of setting items exists also within the property pane, it is difficult for a user to immediately grasp which block is associated with which setting item.

The present disclosure has been made in view of the above-described problem and an object is to make it possible for a user to easily grasp the correspondence relationship between a text block and a setting item on a UI screen having a preview pane and a property pane.

SUMMARY

The image processing system that computerizes a document according to the present disclosure includes: a memory that stores a program; and a processor that executes the program to perform: displaying a user interface screen for setting a property to a scanned image obtained by scanning the document; and controlling a display on the user interface screen, and on the user interface screen, at least a preview pane that is an area preview-displaying the scanned image and a property pane that is an area to which a setting value of each setting item of the property is input exist, and wherein at least a part of a field of a setting item displayed in the property pane and a text block corresponding to the setting item in the scanned image preview-displayed in the preview pane are colored with a same color or similar colors.

Further features of the present disclosure will become apparent from the following description of exemplary embodiments with reference to the attached drawings.

BRIEF DESCRIPTION OF THE DRAWINGS

FIG. 4A is a diagram explaining a state transition of a UI screen;
FIG. 4B is a diagram explaining an orthogonal coordinate system;
FIG. 5 is a diagram explaining a state transition of a UI screen;
FIG. 10A is a diagram explaining similarity determination of a color and FIG. 10B is a diagram explaining a change in an item color;
FIG. 12 is a diagram explaining effects of the modification example 3;
FIG. 14 is a diagram explaining a state transition of a UI screen.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
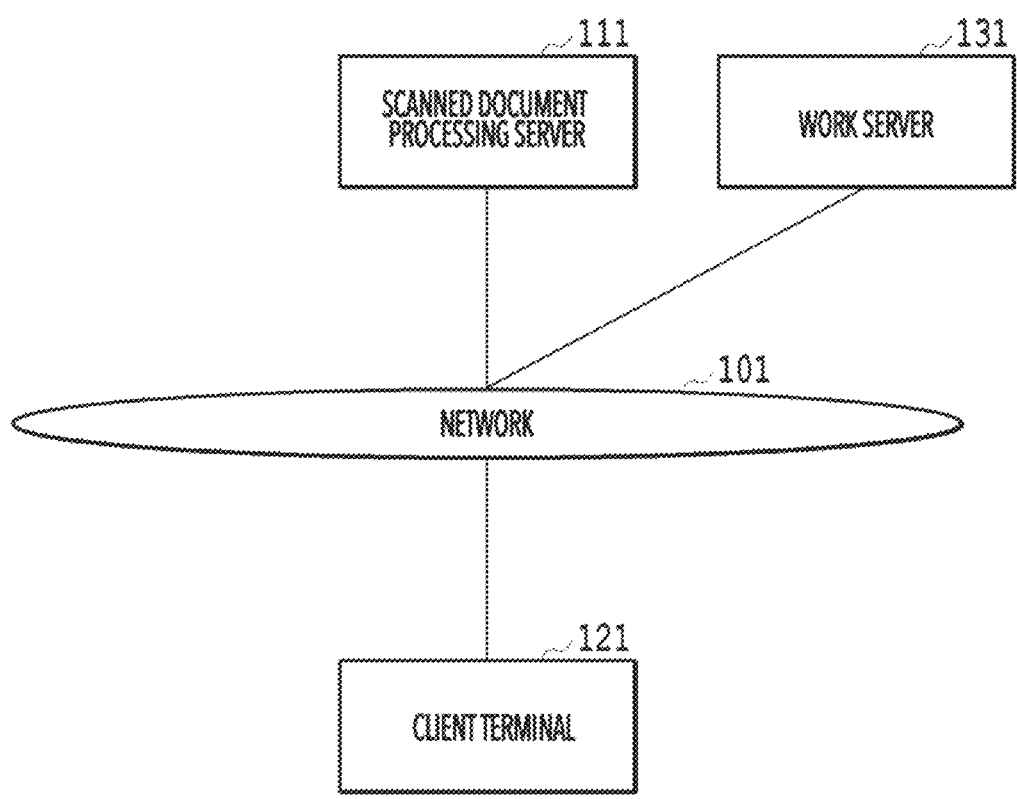
FIG. 1 is a diagram showing an entire configuration of an image processing system.

FIG. 1 is a diagram showing the entire configuration of an image processing system that computerizes a document according to the present embodiment. The image processing system includes a scanned document processing server 111, a client terminal 121, and a work server 131. The client terminal 121 is connected with the scanned document processing server 111 and the work server 131 so as to be capable of communication via a network 101, such as an internet and an intranet. The client terminal 121 may be an MFP (Multifunction Peripheral) and the like comprising the scanner function, in addition to a personal computer, a laptop computer, a tablet computer, a smartphone and the like. The configuration of the image processing system shown in FIG. 1 is an example, but the configuration is not limited to this. For example, it may also be possible for the client terminal 121 to have the function of the scanned document processing server 111. In the following explanation, a scanned image obtained by scanning a processing-target document, such as an estimate form, is called "scanned document".

<Hardware Configuration>

Figure 2:
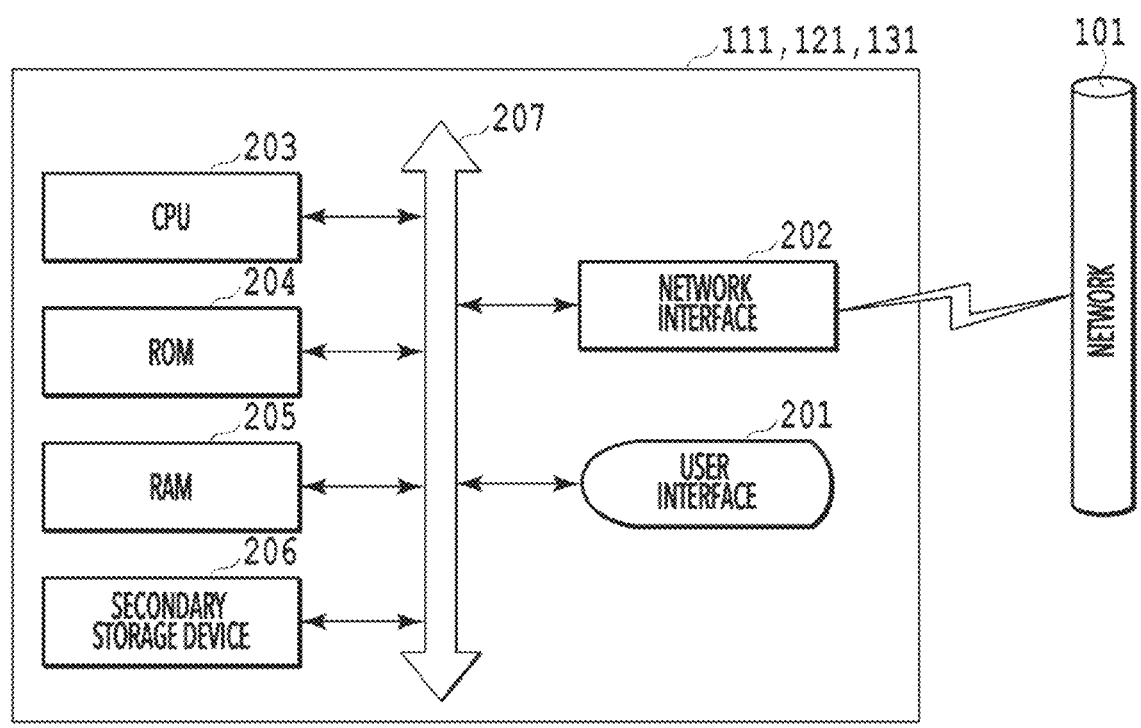
FIG. 2 is a block diagram showing a hardware configuration of an information processing apparatus.

FIG. 2 is a block diagram showing the hardware configuration of the scanned document processing server 111, the client terminal 121, and the work server 131, each as an information processing apparatus. A user interface (UI) 201 is implemented by a display, a keyboard, a mouse, a button, a touch panel and the like and inputs and outputs information and signals. It is also possible for a computer not comprising the hardware such as this to connect and operate from another computer by a remote desktop, a remote shell, and the like. A network interface 202 connects to the network 101 and performs communication with another information processing apparatus and a network device, not shown schematically. The communication method may be wired or wireless. A CPU 203 is a computing device in charge of the control of the entire apparatus and executes programs read from a ROM 204, a RAM 205, a secondary storage device 206 and the like. The ROM 204 stores incorporated programs and various kinds of data. The RAM 205 temporarily stores various kinds of data and also functions as a work memory of the CPU 203. The secondary storage device 206 is a large-capacity storage device represented by an HDD and a flash memory. Each of the units described above is connected to one another via an input/output interface 207.

<Software Configuration>

Figure 3:
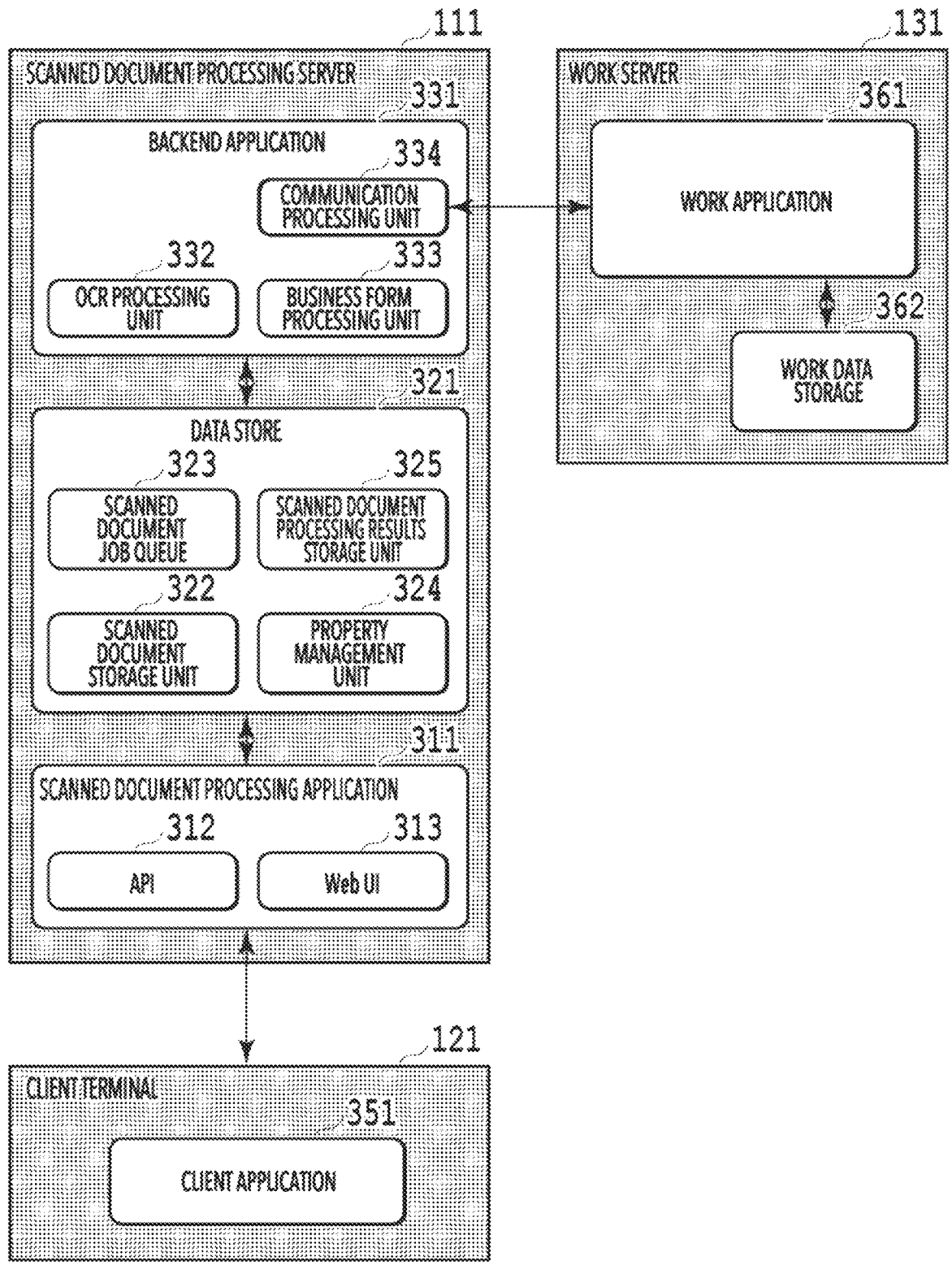
FIG. 3 is a diagram showing a software configuration of the image processing system.

FIG. 3 is a diagram showing the software configuration of the image processing system according to the present embodiment. Each piece of software is installed in the scanned document processing server 111, the client terminal 121, and the work server 131, respectively, described above and executed by the CPU 203 of each apparatus. In the following, each piece of software is explained.

<<Software of Scanned Document Processing Server>>

A scanned document processing application 311 is a Web application installed in the scanned document processing server 111. However, the scanned document processing application 311 may be in an application mounting form other than a Web application. An API 312 is an API (Application Programming Interface) provided by the scanned document processing application 311. A Web UI 313 is a Web user interface provided by the scanned document processing application 311.

A data store 321 is a storage area saving and storing data that is used by the scanned document processing application 311 or a backend application 331, to be described later. In the data store 321, a scanned document storage unit 322, a scanned document job queue 323, a property management unit 324, and a scanned image processing results storage unit 325 exist. The scanned document storage unit 322 files the data of a scanned image itself and saves as an image file, such as JPEG, or a document file, such as PDF (Portable Document Format). The scanned document job queue 323 stores a queue managing jobs to be subjected to property input processing, to be described later. The property management unit 324 manages a list of setting items and a format of a name or a value (character string, figure and the like) for each setting item, relating to properties, such as a file name, a folder path, and metadata, which need to be attached for each scanned document, item color information, to be described later, and the like. The scanned document processing results storage unit 325 stores OCR processing results and business form determination results. Further, the scanned document processing results storage unit 325 stores character area information (text block information) associated with a setting item, a set value, and the like for each scanned document.

The backend application 331 is an application for performing background processing. The backend application 331 is an application in charge of various kinds of processing that may be performed sequentially on the background, specifically, OCR processing, business form processing, and communication processing. An OCR processing unit 332 acquires a processing-target scanned document from the scanned document storage unit 322 and performs OCR processing for the acquired scanned document. In the OCR processing, information specifying each text block (specifically, information on the start point coordinates, width, height of a rectangular area) and information on a recognized character string of each text block are extracted. A business form processing unit 333 determines the type of the scan-target document (business form) by using the information on the processing-target scanned document, the arrangement pattern of text blocks and the recognized character strings, which are obtained by the OCR processing. This determination processing may be any method, such as pattern recognition and machine learning. A communication processing unit 334 performs processing to transmit a scanned document and analysis processing results thereof to the work server 131, which is an external apparatus. In a case where it is not necessary to transmit a scanned document and analysis processing results thereof, the communication processing unit 334 may be omitted.

<<Software of Client Terminal>>

A client application 351 performs the Web application of the above-described scanned document processing application 311. For example, the client application 351 performs the Web application by displaying the Web UI 313 by a Web browser and performing transmission and reception of necessary data with the API 312.

<<Software of Work Server>>

A work application 361 is an application for assisting various kinds of work in a company, such as file management, document management, order reception, and accounting. A work data storage 362 saves various kinds of data used by the work application 361. The work application 361 receives results of processing by the scanned document processing server 111 and performs necessary processing for the results and stores the results.

<UI Screen of Client Application>

Following the above, a user interface screen (hereinafter, described as "UI screen") that is displayed on the user interface 201 of the client terminal 121 is explained. FIG. 4A shows an example of a UI screen that is displayed on the user interface 201 by the client application 351 according to the present embodiment.

The UI screen shown in FIG. 4A has a two-pane configuration of a Preview pane 401 and a Property pane 411. Here, within the Preview pane 401, a page image 402 of a scanned document of "PURCHASE ORDER" is preview-displayed. In the Preview pane 401, it is possible to display any position in the page image 402 by scrolling or zooming the page image 402. The Property pane 411 is a pane for displaying and editing a property to be attached to the processing-target scanned image. Items that are set as properties include master items, such as "File Name", "Folder Path", and "Metadata", and slave items, such as "Company Name", "Date", and "Address", which are elements configuring the master items. Explanation below is given by taking a case as an example where "Metadata" is set and registered as the master item.

The UI screen in FIG. 4A is an example in a case where the business form type of the processing-target scanned document is determined to be "PURCHASE ORDER" in the business form determination processing. Then, the state is such that three slave items "Customer Name", "Address", and "Billing Name" are displayed as the contents of the master item "Metadata" to be attached to the scanned document. In the following explanation, the slave item of the metadata is called "metadata item".

FIG. 4B is a diagram explaining an orthogonal coordinate system indicating a relationship between the page image 402 and each text block. In FIG. 4B, three text blocks 421, 422, and 423 exist. In the page image 402, there are more text blocks, but they are omitted here. The text block detected by OCR processing is identified respectively by the start point coordinates, width, and height as shown by a hatched rectangle. For example, the text block 423 corresponding to the character string of "XYZ Corporation" is represented as "Start point coordinates (1200, 700)", "Width: 720" and "Height: 120" in units of pixels.

Figure 5:
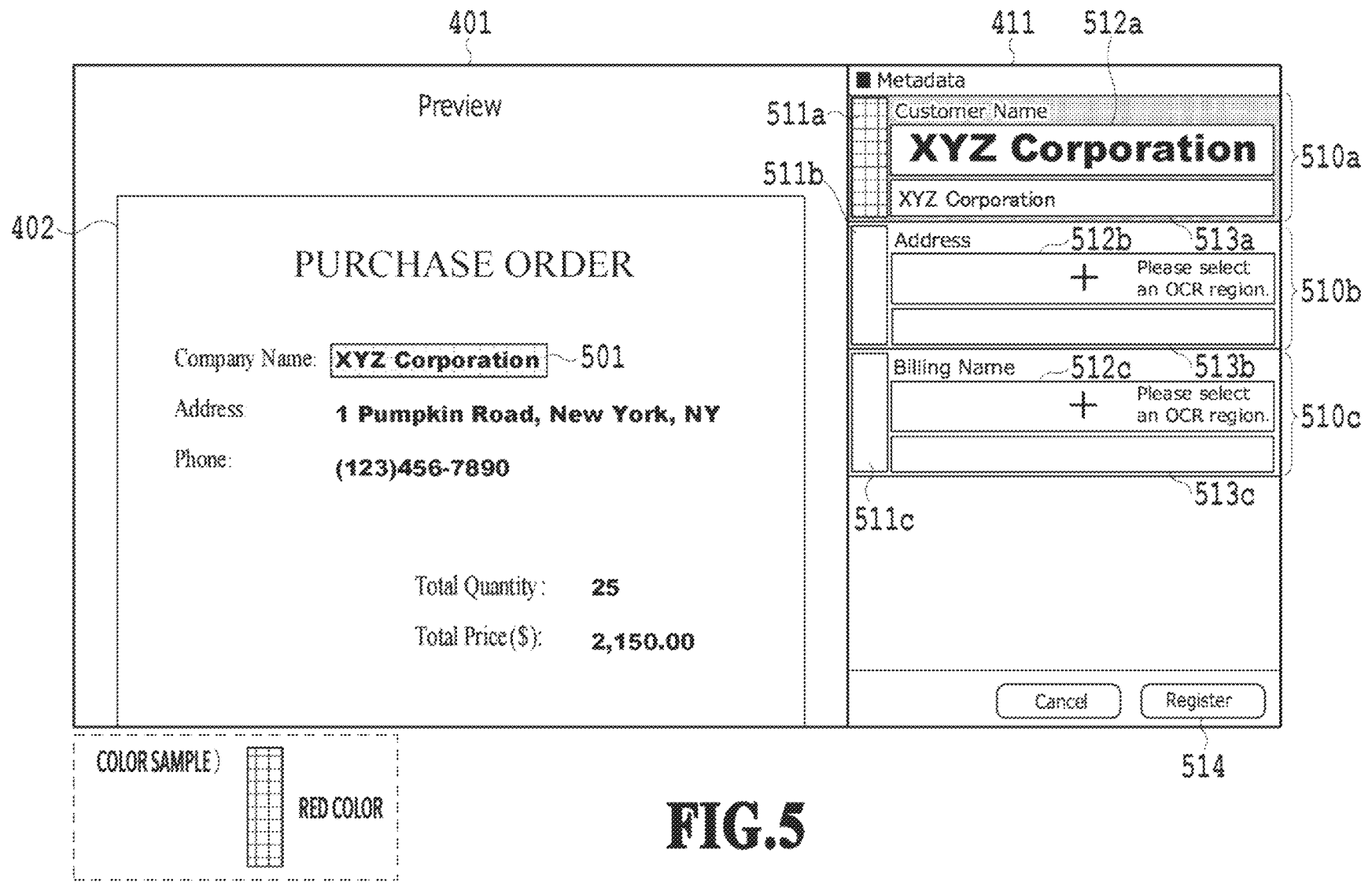

FIG. 5 is a diagram explaining the way a text block within the page image 402 is associated with the metadata item on the UI screen in FIG. 4A. Here, the state is such that a text block 501 corresponding to the character string of "XYZ Corporation" within the page image 402 and the metadata item "Customer Name" (item of 510a) are associated with each other. Then, in order to enable a user to easily identify, on the text block 501, a rectangle colored in a color (in the example in FIG. 5, "red color" allocated to the metadata item "Customer Name") allocated to each metadata item based on item color information is displayed in a transparent and superimposing manner. The coloring method is not limited to the transparent and superimposed display and may be a superimposed display or the like by a colored frame line. Horizontally elongated rectangles 510a to 510c within the Property pane 411 are display fields in which setting values and the like of the metadata items, which are slave items, are displayed and edited for the metadata, which is the master item. Further, vertically elongated rectangles 511a to 511c are item color areas that are each provided at a portion within the display field and which each display a color (item color) allocated to each metadata item so as to enable a user to identify the color. Then, horizontally elongated rectangles 512a to 512c are each an area (cut-out image area) in which an image (image cut out from the page image 402) corresponding to the text block selected by a user is displayed. In the stage in which association with any text block is not performed yet, the state is such that a "+" button is displayed as in the cut-out image areas 512b and 512c and the item colors of the item color areas 511b and 511c are not displayed. Horizontally elongated rectangles 513a to 513c located under each of the cut-out image areas 512a to 512c are each an editing area in which the recognized character string included in the text block relating to user selection is displayed and it is possible for a user to edit the displayed contents with a soft keyboard or the like, not shown schematically.

<UI Screen Control Processing>

Figure 6:
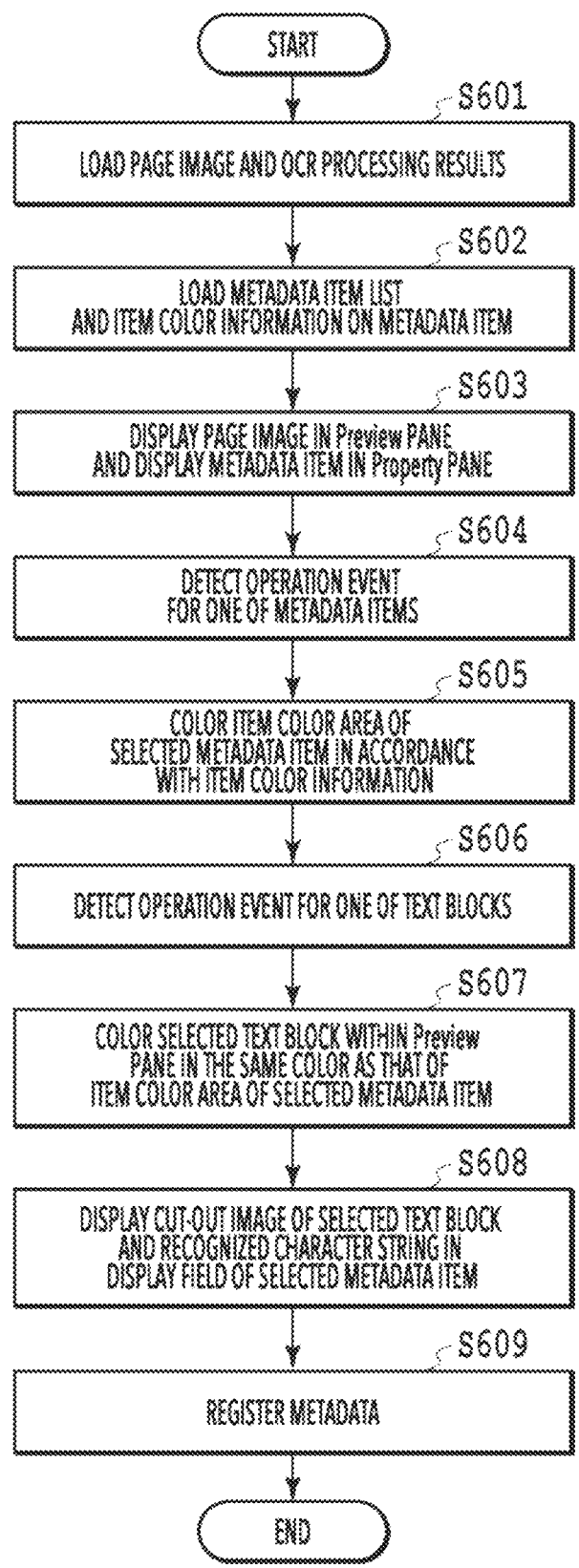
FIG. 6 is a flowchart showing a flow of UI screen control processing according to a first embodiment.

Next, control processing to associate a text block with each metadata item on the UI screen described above, which is performed by the client application 351 of the client terminal 121, is explained by using a flowchart in FIG. 6. Prior to the start of execution of the flow shown in FIG. 6, first, a queue of jobs to be processed is provided to the client application 351 by the scanned document processing application 311 of the scanned document processing server 111. In a case where a user selects a job of a scanned document for which the user desires to start processing by using the client application 351, the scanned document processing application 311 acquires necessary information corresponding to the selected scanned document from the data store 321. Specifically, the scanned document processing application 311 acquires the corresponding image file from the scanned document storage unit 322 and acquires the corresponding OCR processing results and business form type determination results from the scanned document processing results storage unit 325. Further, the scanned document processing application 311 acquires the metadata item list for each business form type and the item color information for identifying a predetermined color allocated in advance for each metadata item from the property management unit 324. These pieces of acquired data are provided to the client application 351 from the scanned document processing application 311 and the flow in FIG. 6 is started. In the following explanation, symbol "S" represents a step.

At S601, the data of the page image and the OCR processing results (recognized character string) is loaded, which are to be displayed within the Preview pane 401. At S602 that follows, the metadata item list corresponding to the business form type and the item color information are loaded. At next S603, the contents of the data loaded at S601 and S602 are reflected on the UI screen. Specifically, the page image is displayed within the Preview pane 401 and each metadata item included in the metadata item list is displayed within the Property pane 411. By the processing at S601 to S603 performed so far, the state of the UI screen shown in FIG. 4A is brought about. At this point in time, coloring to the item color areas 511a to 511c of each metadata item within the Property pane 411 is not performed yet and the item color areas 511a to 511c are in the default (for example, gray) state. The reason is to present that metadata is not set yet to a user in an easy-to-see manner and prompt the user to set metadata by representing visually that coloring is not determined yet, together with the "+" button display in the cut-out image area 512 described previously.

Then, at S604, an operation event of the selection operation of the "+" button of the cut-out image areas 512a to 512c in one of the metadata items within the Property pane 411 is detected. This selection operation is an operation of a user touching or the like the "+" button on the touch panel with a finger or a touch pen, or a click operation with a mouse. In this manner, one metadata item relating to the user selection is determined among one or a plurality of metadata items included in the metadata item list. In the following, the metadata item selected by a user is called "selected metadata item". At S605 that follows, the item color area of the selected metadata item determined at S604 is colored in accordance with the item color information loaded at S602. Here, it is assumed that in the item color information, a specific color is associated with the order of each slave item existing within the master item. For example, four colors of blue, green, yellow, and red are defined in advance as usable colors and the item order and the color are associated with each other in advance, such as that the first setting item is associated with "blue", the second setting item with "green", the third setting item with "yellow", and the fourth setting item with "red". In this case, the three slave items of "Customer Name", "Address", and "Billing Name" of the master item "Metadata" are in this order, and therefore, "blue", "green", and "yellow" are allocated, respectively, as the item colors. By associating a specific color with the order of a plurality of setting items as described above, it is possible to make common the item color information in a variety of kinds of setting item. It may also be possible to allocate in advance a specific color to each individual specific setting item in the item color information. Further, by highlighting the display field of the selected metadata item for which the selection operation has been performed by a user, for example, such as changing the color of the area other than the item color area within the display field, it is made easier for a user to identify the metadata item currently being selected. As a method of making it possible to identify the metadata item currently being selected is not limited to the method of changing the color, and for example, it may also be possible to highlight the display field of the metadata item by surrounding the display field with a thick-line frame.

Then, at S606, an operation event is detected, such as a touch operation to one of text blocks existing in the page image 402 within the Preview pane 401. In this manner, one arbitrary text block is selected from one or a plurality of text blocks included in the page image. In the following, the text block selected by a user is called "selected text block". At S607 that follows, the selected text block determined at S606 is colored in the same color as that in which coloring has been performed to the item color area within the selected metadata item colored at S605. Then, at S608, the cut-out image corresponding to the selected text block colored at S607 is displayed in the cut-out image area within the selected metadata item. Further, the recognized character string included in the selected text block colored at S607 is displayed within the editing area of the selected metadata item determined at S604. By the processing at S604 to S608 performed so far, the state of the UI screen as shown in FIG. 5 is brought about. That is, the metadata item selected by a user and the text block are associated with each other and which text block is used to input the character string used in the selected metadata item is determined.

In a case where the above processing is completed for all the metadata items within the metadata item list and a "Register" button 514 is touched by an operation of a user, at S609, a request to register metadata is transmitted to the scanned document processing server 111. In this metadata registration request, information associating edited values in all the metadata items and the text blocks with each other is included. In the scanned document processing server 111, the scanned document processing application 311 saves the above-described information included in the metadata registration request received from the client terminal 121 in the scanned document processing results storage unit 325. At this time, in a case where the registration of metadata is performed in the external work server 131, the metadata registration request is transferred to the work server 131 via the communication processing unit 334. After all the necessary processing is completed, the scanned document processing application 311 dequeues the queue from the scanned document job queue 323. In this manner, this processing is completed.

The above is the contents of the UI screen control processing in the client application 351 according to the present embodiment. In the present embodiment, the item color area indicating the color allocated for each setting item is provided for each display field of each setting item, but it is not mandatory to provide each individual item color area. That is, it may also be possible for the area (area except for the cut-out image area and the editing area in each display field) for the highlight indicating that the setting item is selected by a user to display an item color. In a case where the configuration is made so that the item color is displayed in the area except for the cut-out image area and the editing area within each display field, as the highlight indicating that a use has selected the setting item, it is sufficient to produce the highlight by, for example, attaching a thick-line frame that surrounds the selected display field, changing the density of the color, and so on.

Modification Example 1

In the flow in FIG. 6 described above, at the timing (S605) of the highlight accompanying the selection of the metadata item of interest by a user (detection of touch operation to the "+" button within the cut-out image area), the coloring to the item color area is performed. However, the timing of coloring to the item color area is not limited to this. For example, it may also be possible to perform coloring to the item color area within the selected metadata item at the same timing as that of coloring to the selected text block at S607.

Modification Example 2

In the flow in FIG. 6 described above, by coloring the selected text block within the Preview pane in the same color as that of the item color area of the selected metadata item, it is made possible for a user to grasp the correspondence relationship between the metadata item and the text block. At this time, there is a possibility that the color used for coloring and the character color or the background color within the selected text block are similar to each other. In this case, the visual recognizability of the color used for coloring to the selected text block is degraded. Consequently, an aspect is explained as a modification example 2 in which the color used for coloring is changed as needed.

Figure 7:
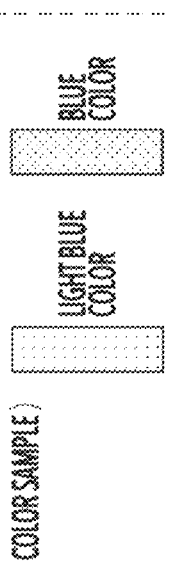
FIG. 7 is a diagram explaining a problem of a modification example 2.

FIG. 7 is a diagram explaining a problem of the present modification example, which corresponds to FIG. 5 described previously. In a page image 402' in FIG. 7, three character strings "XYZ Corporation", "1 Pumpkin Road, New York, N.Y.", and "(123) 456-7890" whose character color is black are surrounded by ruled lines and the background color in the light blue color is attached to the inside thereof. Here, the state is such that a text block 701 corresponding to the character string of "XYZ Corporation" within the page image 402' and the metadata item "Customer Name" are associated with each other. Then, among the three metadata items, "Customer Name" is the first setting item, and therefore, the blue color is displayed in the item color area 511*a* within the display field 510*a* thereof. As a result of that, the light blue color, which is the background color within the ruled lines surrounding the character string of "XYZ Corporation", and the blue color used for coloring to the text block 701 are similar to each other (similar colors). In this situation, it is difficult for a user to grasp that the text block 701 and the metadata item "Customer Name" are associated with each other.

Figure 8:
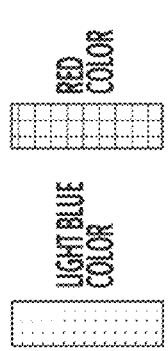
FIG. 8 is a diagram explaining effects of the modification example 2.

FIG. 8 is a diagram explaining effects in a case where the present modification example is applied. As in FIG. 7, the state is such that the text block 701 corresponding to the character string of "XYZ Corporation" within the page image 402' and the metadata item "Customer Name" are associated with each other. However, in FIG. 8, in the item color area 511*a* of the metadata item "Customer Name", the red color is displayed in place of the original blue color. As a result of that, between the light blue color, which is the background color within the ruled lines surrounding the character string of "XYZ Corporation", and the red color in which the text block 701 is colored, a contrast in color occurs, and therefore, it is made possible for a user to easily grasp the association.

Figure 9:
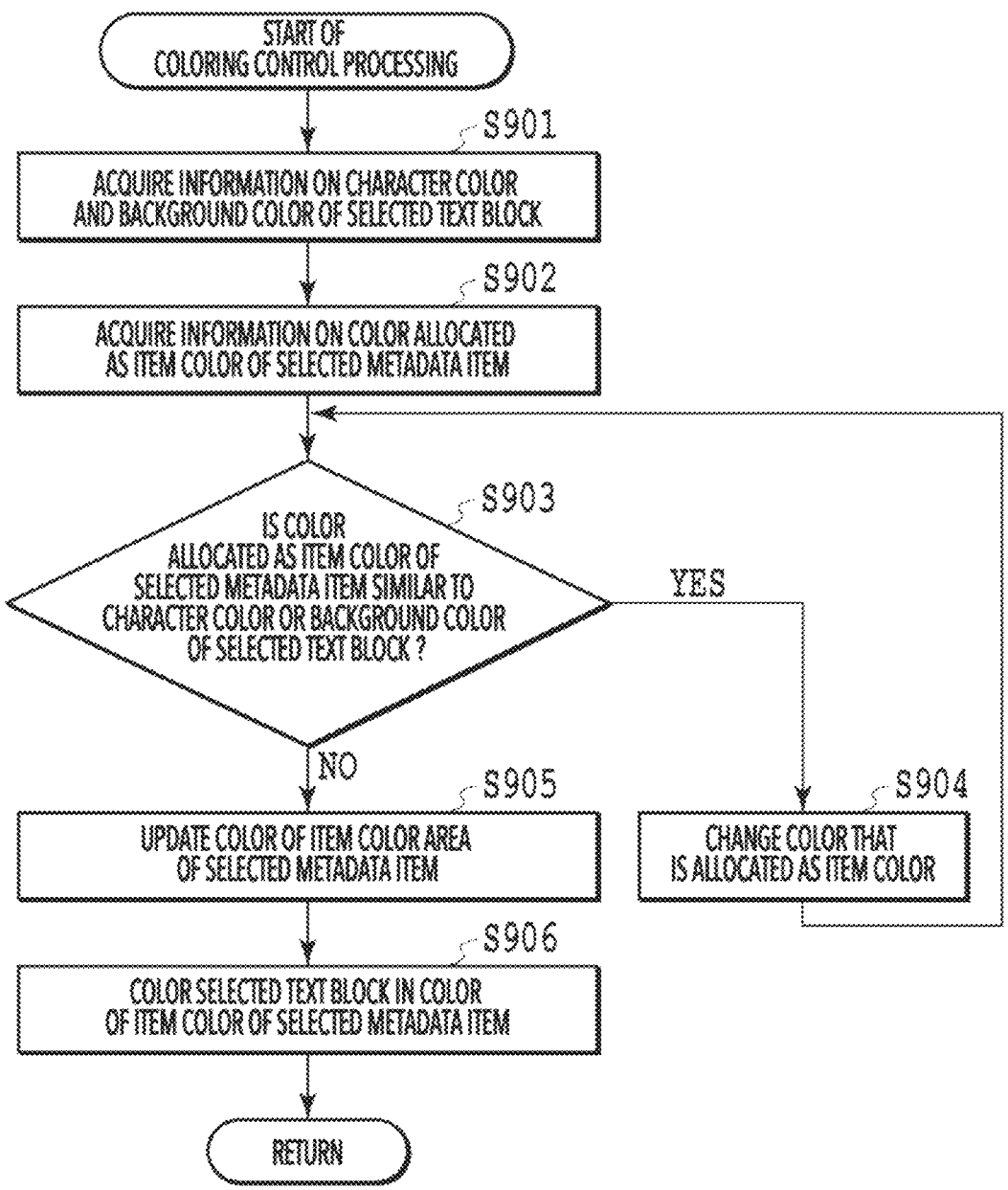
FIG. 9 is a flowchart showing details of coloring control processing according to the modification example 2.

Here, details of the processing to control coloring to the setting item and the text block according to the present modification example are explained with reference to the flowchart in FIG. 9. The coloring control processing shown in the flow in FIG. 9 is performed in place of S607 in the flow in FIG. 6 described previously.

At S901, the information on the character color of the character string included in the selected text block for which the operation event has been detected at S606 and the background color of the text block is acquired from the scanned document processing results storage unit 325 via the scanned document processing application 311. Here, explanation is continued on the assumption that information on values (R, G, B=0, 5, 5) indicating black as the character color and values (R, G, B=188, 213, 254) indicating light blue as the background color is acquired.

At S902, information on the color used for coloring based on the item color information at S605 (that is, the color allocated as the item color of the selected metadata item and used for coloring to the item color area) is acquired. It is assumed that allocation of "blue" to the first setting item, "green" to the second setting item, "yellow" to the third setting item, and "red" to the fourth setting item is defined as the default contents in the item color information in the present modification example. Here, in a case where the first "Customer Name" is selected among the three metadata items within the Metadata pane 411, the item color area is colored in "blue", and therefore, in this case, information (for example, RGB values) indicating "blue" is acquired.

At next S903, the color allocated as the item color of the selected metadata item and the character color and the background color within the selected text block are compared and whether they are similar to each other is determined. For example, as shown in FIG. 10A, the RGB values of the color allocated as the item color of the selected metadata item and the RGB values of the character color and the background color acquired at S901 are compared, respectively, and whether the difference therebetween is within a predetermined threshold value is determined. At this time, it is desirable to set a threshold value by which, for example, the light blue color or the purple color, whose hue is close to that of the blue color, is determined to be "similar" to the blue color. Here, it is assumed that the blue color allocated as the item color of the selected metadata item "Customer Name" is determined to be similar to the light blue color, which is the background color of the selected text block. In a case where the color allocated as the item color for the selected metadata item is determined to be similar to the character color or the background color within the selected text block in this manner, the processing advances to S904. On the other hand, in a case where it is determined that they are not similar, the processing advances to S905.

At S904, processing to change the color currently allocated as the item color of the selected metadata item to another different color defined in the item color information is performed. Specifically, the association between the item order and each color in the candidate color information is changed and a different color is allocated to the selected metadata item. In a case of the above-described example, the order of the selected metadata item "Customer Name" is the first. Consequently, as shown in FIG. 10B, the color is changed to the color associated with the fourth selected metadata item (in this case, "red") whose order is the last and which is not used in the above-described example and at the same time, processing to associate "blue" with the fourth selected metadata item is performed. By exchanging the colors between the first and fourth selected metadata items in this manner, it is possible to maintain the color association between the second and third selected metadata items, and therefore, it is possible to suppress the influence by the change to a minimum. After changing the color that is the item color of the selected metadata item in this manner and updating the item color information in accordance with the change, the processing returns to S903 and the similarity determination is performed again. This processing is repeated until the determination results indicate that the color allocated as the item color is no longer similar to the character color or the background color within the selected text block.

Then, at S905, the display of the color of the item color area of the selected metadata item is updated as needed. That is, in a case where the color allocated as the item color of the selected metadata item is changed to another color at S904, coloring is performed in the newly changed color.

At S906, the selected text block is colored by using the same color as the color being displayed in the item color area of the selected metadata item. Due to this, the state of the UI screen as shown in FIG. 8 described previously is brought about. In a case where coloring is completed, the processing returns to the flow in FIG. 6 and the display processing at S608 is performed.

The above is the contents of the coloring control processing according to the modification example 2. As described in the first embodiment, it may also be possible to perform control so that the coloring to the item color area within the selected metadata item is not performed until the coloring to the selected text block is performed and coloring to both the item color area and the selected text block is performed at the same timing.

Modification Example 3

With an increase in the number of setting items, a case may occur where it is difficult to select a color that is not similar to the character color or the background color from among the colors defined in the item color information and allocate the color. Consequently, an aspect is explained as a modification example 3 in which a color that is the item color of each setting item is determined and allocated without basing the determination and allocation on the item color information.

Figure 11:
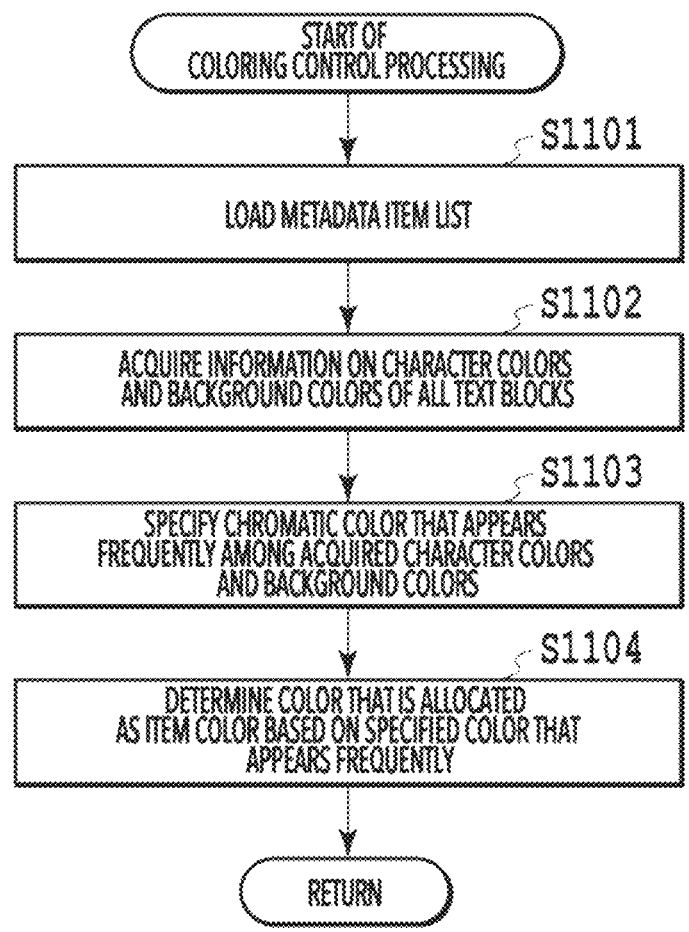
FIG. 11 is a flowchart showing details of coloring control processing according to a modification example 3.

Details of processing to control coloring to a setting item and a text block according to the present modification example are explained with reference to the flowchart in FIG. 11. It is assumed that the coloring control processing shown in the flow in FIG. 11 is performed in place of S602 in the flow in FIG. 6 described previously. Then, at S605 in the flow in FIG. 6 in a case where the present modification example is applied, coloring to the item color area is performed by using a color determined by processing, to be described later, in place of a color determined based on the item color information.

At S1101, the metadata item list is loaded. That is, in a case of the present modification example, item color information is not loaded. At S1102 that follows, from the OCR processing results loaded at S601, the information on the character colors of the character strings included in all the text blocks within the page image and the background colors of the text blocks is acquired.

At S1103, in the character colors and the background colors acquired at S1102, a chromatic color whose frequency of appearance is high is specified. For example, it is assumed that 100 text blocks exist within the page image and the black color is used as all the character colors. On the other hand, as to the background color, it is assumed that there are 80 text blocks for which the white color is used, 18 text blocks for which the light blue color is used, and two text blocks for which the yellowish green color is used. In this case, the chromatic color is the light blue color and the yellowish green color, and therefore, the light blue color whose number of times of use is large is specified as the chromatic color whose frequency of appearance is high. The reason black and white, which are achromatic colors, are excluded is that they are not suitable to the use as the item color aimed at identification because black and white are used generally in a business form and the like.

At S1104, based on the chromatic color that appears frequently, which is specified at S1103, the item color for each metadata item is determined. Examples of a specific determination method are as follows.

A first method is a method that makes use of a hue circle. In this case, with a chromatic color that appears frequently being taken as a reference, a color located at a distant position in the hue circle is determined as the item color for each metadata item. For example, in a case where the chromatic color that appears frequently is the light blue color and this is taken as a reference, the color located as the most distant position in the hue circle is the orange color, and therefore, a color that is allocated as the item color is determined in a predetermined range with the orange color being taken as a center (for example, range from yellow color to purple color). At this time, in a case where a plurality of setting items to which an item color is to be allocated exists and it is necessary to determine a plurality of colors, it is sufficient to select the plurality of colors so that, for example, the intervals in the hue circle are substantially equal in order to distinguish between the plurality of colors.

A second method is a method of determining a color that is not similar to the chromatic color that appears frequently as the item color among a plurality of candidate colors determined in advance. For example, as candidate colors, five colors of red, green, yellow, blue, and purple are determined in advance. Then, in a case where the chromatic color that appears frequently is the light blue color, the color is allocated as the item color sequentially from the remaining four colors (red, green, yellow, purple) except for the blue color similar to the light blue color. It is sufficient to determine the number of candidate colors at this time in accordance with the format or the like of the business form supposed as the processing target. Further, at the time of determining the color to be excluded, it is sufficient to perform the same similarity determination as that explained at S903 of the modification example 2.

The two methods explained above are examples and any method may be used as long as the method is capable of allocating a color a user can easily distinguish from another color as the item color with the chromatic color that appears frequently being taken as a reference.

Figure 12:
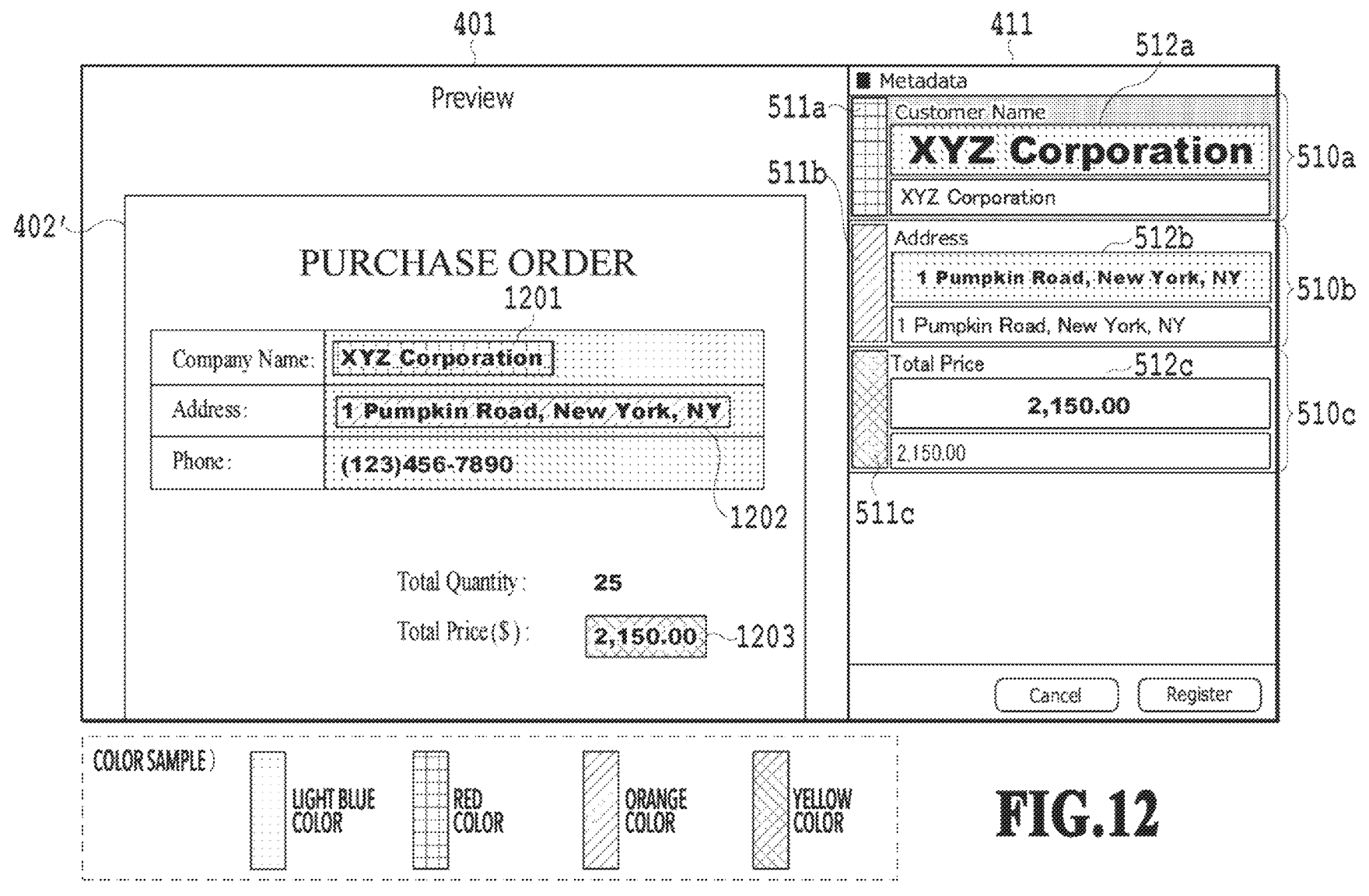

FIG. 12 is a diagram explaining effects in a case where the present modification example is applied. In this example, the background color within the ruled lines surrounding the character string of "XYZ Corporation" is the light blue color, and therefore, three colors not similar to the light blue color are determined as the item colors and allocated. That is, to the three metadata items "Customer Name", "Address", and "Total Price", the red color, the orange color, and the yellow color are allocated respectively as the item colors. Due to this, the colors used for coloring to three text blocks 1201 to 1203 are conspicuous, and therefore, it is made possible for a user to easily grasp the association between the color and the selected text block corresponding to each selected metadata item.

The above is the contents of the coloring control processing according to the modification example 3. There may be a plurality of colors specified as chromatic colors that appear frequently. Further, it may also be possible to specify a chromatic color that appears frequently by taking only the text blocks existing in a partial area, for example, such as the top portion of the page image, as a target in place of all the text blocks existing within the page image. As in the modification example 2, it may also be possible to perform control so that coloring to the item color area within the selected metadata area is not performed until coloring to the selected text block is performed and coloring to both the item color area and the selected text block is performed at the same timing.

As described above, according to the present embodiment, even in a case where a plurality of text blocks exists within the page image and a plurality of setting items (slave items) exists within the property pane on the UI screen having the preview pane and the property pane, it is possible for a user to easily grasp the correspondence relationship therebetween.

Second Embodiment

In the first embodiment, the UI screen control on the assumption of a case where one-to-one association in which one text block is associated with one metadata item is performed is explained. Next, UI screen control capable of dealing also with a case where one-to-N association in which the same text block is associated with a plurality of metadata items is performed is explained as a second embodiment. Explanation of the contents in common to those of the first embodiment, such as the system configuration, is omitted and in the following, different points are explained mainly.

<UI Screen Control Processing>

Figure 13:
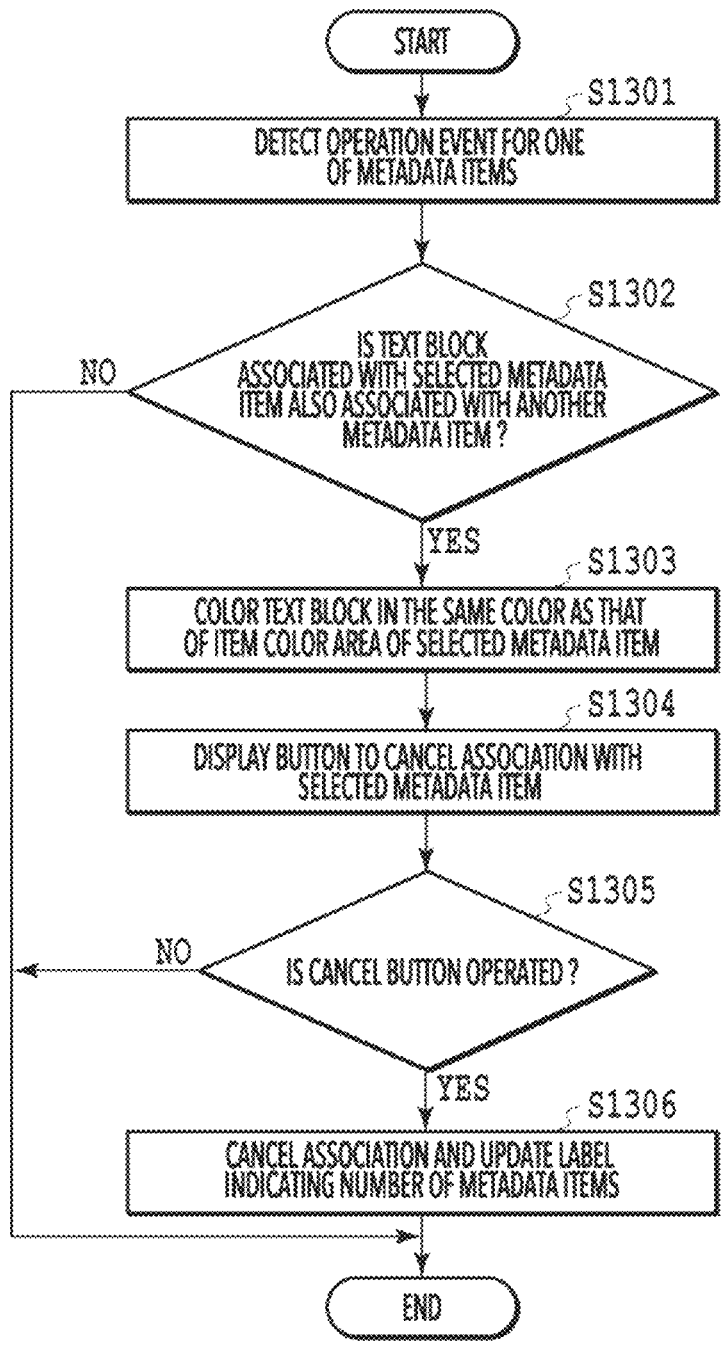
FIG. 13 is a flowchart showing a flow of UI screen control processing according to a second embodiment.

The UI screen control processing according to the present embodiment, which is performed by the client application 351 of the client terminal 121, is explained by using the flowchart in FIG. 13. Here, explanation is given on the assumption that association between each of the three metadata items "Customer Name", "Address", and "Billing Name" and the text block has been performed along the flow in FIG. 6 of the first embodiment and the state of the UI screen shown in FIG. 14 is brought about.

Figure 14:
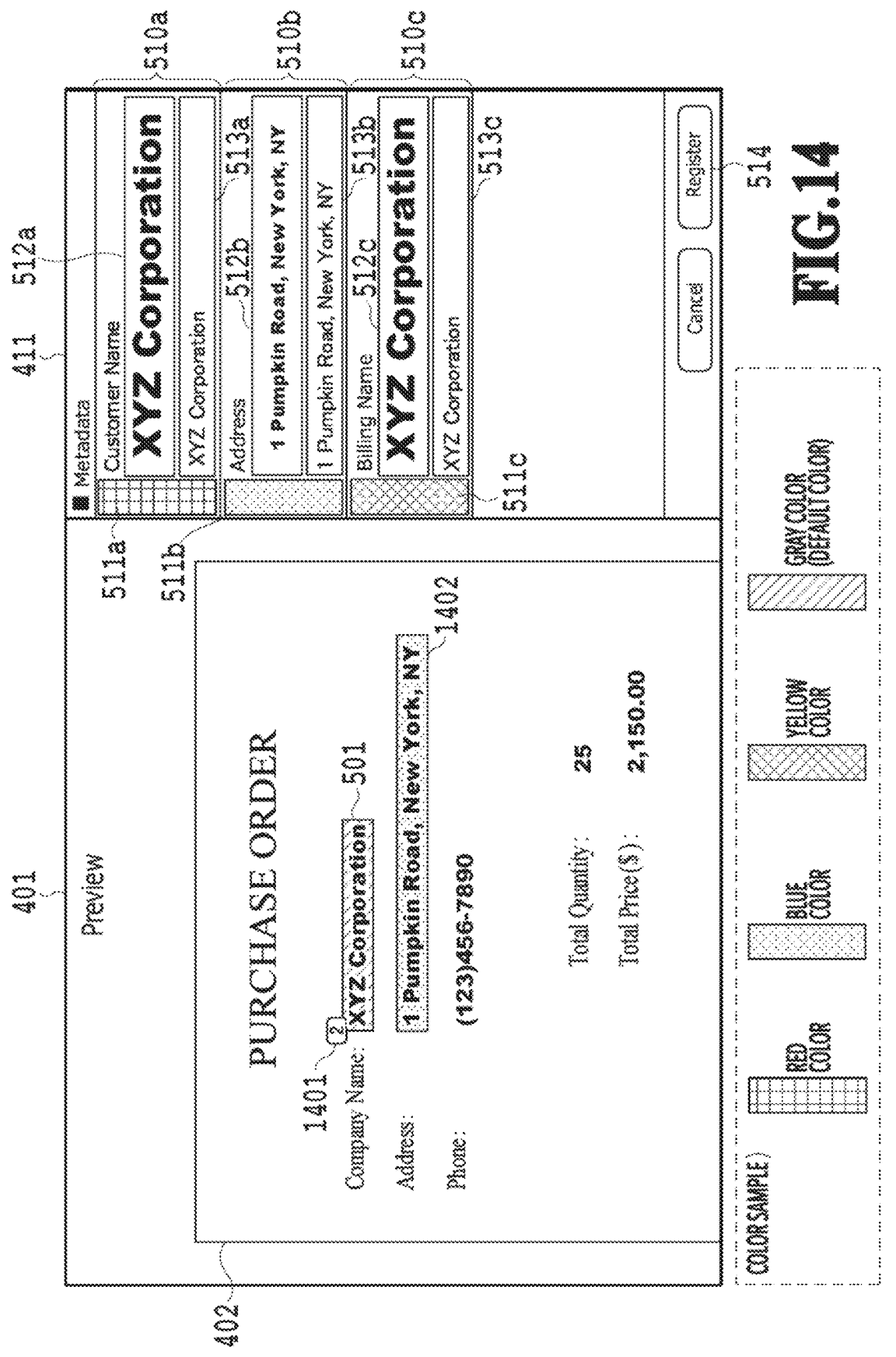

On the UI screen in FIG. 14, at the top left of the text block 501 within the page image 402, a label 1401 indicating the number of metadata items (here, "two") with which the text block is associated is attached. This label is displayed at the timing at which the same text block is associated with a plurality of metadata items (that is, at the point in time at which the number of metadata items becomes two or more), but this is not limited and it may also be possible to display the label at the timing at which the text block is associated with one of metadata items. Then, here, the text block 501 is the state of being colored in the default color (here, gray color) in a case where association with a plurality of metadata items is performed. In contrast to this, a text block 1402 associated with only one metadata item "Address" is colored in the blue color indicated by the corresponding item color area 511b.

It is assumed that one of the display fields 510a to 510c of each metadata item within the Property pane 411 is selected by a user (touch operation or the like with a finger) in a case where the UI screen is in the state shown in FIG. 14. At S1301, the operation event, such as the touch operation or the like by a user, is detected. Here, it is assumed that the operation event for the display field 510c of "Billing Name" is detected. At S1302 that follows, whether the text block associated with the metadata item selected by the user is also associated with another metadata item is determined. In a case where the determination results are "No", this processing is completed. On the other hand, in a case where the determination results are "Yes", the processing advances to S1303. Here, the text block 501 is associated with the metadata item "Billing Name" selected by the user and further, the text block 501 is also associated with the metadata item "Customer Name". Consequently, the determination results in this case is "Yes" and the processing advances to S1303 as a result.

Figure 15:
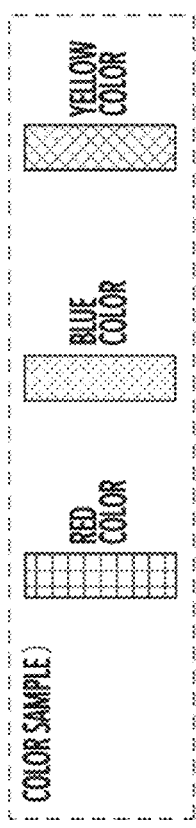
FIG. 15 is a diagram explaining a state transition of a UI screen.

At S1303, the text block associated with the selected metadata item is colored in the same color as the color of the item color area of the selected metadata item. Here, the color of the text block 501 changes from the gray color, which is the default color, to the yellow color indicated by the item color area 511c within the display field of the metadata item "Billing Name". The UI screen shown in FIG. 15 shows the state where the color of the text block 501 has changed from the gray color to the yellow color accompanying the selection of the metadata item "Billing Name".

At next S1304, a button for cancelling the association between the selected metadata item and the text block is displayed. On the UI screen in FIG. 15, a "x" mark button 1501 that appears at the top right of the text block 501 indicates the cancel button. At S1305 that follows, whether or not the touch operation or the like is performed to the cancel button is determined. In a case where the operation event, such as the touch operation to the cancel button, is detected, the processing advances to S1306 and in a case where no operation event is detected, this processing is exited.

At S1306, the association between the selected metadata item and the text block is cancelled and the label indicating the number of metadata items currently associated is updated. Specifically, as a result of that the association with the selected metadata item is cancelled, "one" is subtracted from the number of metadata items indicated by the label. In the example in FIG. 15, the numerical value of the label 1401 changes from "two" to "one". Further, accompanying this, the display field corresponding to the selected metadata item is initialized and the blank state is brought about. Here, the selected metadata item is "Billing Name", and therefore, the corresponding display field 510c is initialized.

The above is the contents of the UI screen control processing in the client application 351 according to the present embodiment.

As above, according to the present embodiment, even in a case where the same text block is associated with a plurality of setting items (slave items), it is possible for a user to grasp the correspondence relationship between a slave item and a text block both accurately and easily.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, on a UI screen having a preview pane and a property pane, it is possible for a user to easily grasp a correspondence relationship between a text block and a setting item.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-007518 filed Jan. 21, 2020, and No. 2020-031689 filed Feb. 27, 2020, which are hereby incorporated by reference wherein in their entirety.

What is claimed is:
1. An image processing system, comprising:
a memory that stores a program; and
a processor that executes the program to perform:
displaying a user interface screen for setting a property to an image, wherein the user interface screen includes a preview pane that is an area preview- displaying the image and a property pane that is an area to which setting values of setting items of the property are input; and further displaying, on the preview pane of the user interface screen, a label for a first text block included in the image after the first text block is associated with two or more of the setting items displayed in the property pane, wherein the label indicates a number of the two or more of the setting items associated with the first text block.

2. The image processing system according to claim 1, wherein the processor executes the program to further perform:

coloring the first text block with a default color if the first text block is associated with the two or more of the setting items and any of the associated two or more of the setting items is not being in a selected state; and coloring, when a user selects one of the associated two or more of the setting items in the property pane, the first text block with a color corresponding to the selected one setting item.

3. The image processing system according to claim 1, wherein the processor executes the program to further perform:

coloring, if a second text block in the image is associated with only one of the setting items, both of at least a part of a field of the associated only one of the setting items displayed in the property pane and the second text block in the image preview-displayed in the preview pane with a same or similar color.

4. The image processing system according to claim 1, wherein the processor executes the program to further perform:

coloring, in a case where a user selects one of text blocks in the image preview-displayed in the preview pane in a selected state where one of the setting items which is not associated with any text block is selected in the property pane, the selected one text block with a color that is same as or similar to the color allocated to the selected one of the setting items being in the selected state.

5. An image processing system comprising:

a memory that stores a program; and a processor that executes the program to perform:

displaying a user interface screen for setting a property to an image, wherein the user interface screen includes a preview pane that is an area preview-displaying the image and a property pane that is an area to which setting values of setting items of the property are input; and further displaying, on the preview pane of the user interface screen, a label for a first text block included in the image after the first text block is associated with at least one of the setting items displayed in the property pane, wherein the label indicates a number of the at least one of the setting items associated with the first text block.

6. A control method comprising:

displaying a user interface screen for setting a property to an image, wherein the user interface screen includes a preview pane that is an area preview-displaying the image and a property pane that is an area to which setting values of setting items of the property are input; and further displaying, on the preview pane of the user interface screen, a label for a first text block included in the image after the first text block is associated with two or more of the setting items displayed in the property pane, wherein the label indicates a number of the two or more of the setting items associated with the first text block.

7. The control method according to claim 6, further comprising:

coloring the first text block with a default color if the first text block is associated with the two or more of the setting items and any of the associated two or more of the setting items is not being in a selected state; and coloring, when a user selects one of the associated two or more of the setting items in the property pane, the first text block with a color corresponding to the selected one setting item.

8. The control method according to claim 6, further comprising:

coloring, if a second text block in the image is associated with only one of the setting items, both of at least a part of a field of the associated only one of the setting items displayed in the property pane and the second text block in the image preview-displayed in the preview pane with a same or similar color.

9. The control method according to claim 6, further comprising:

coloring, in a case where a user selects one of text blocks in the image preview-displayed in the preview pane in a selected state where one of the setting items which is not associated with any text block is selected in the property pane, the selected one text block with a color that is same as or similar to the color allocated to the selected one of the setting items being in the selected state.

10. A control method comprising:

displaying a user interface screen for setting a property to an image, wherein the user interface screen includes a preview pane that is an area preview-displaying the image and a property pane that is an area to which setting values of setting items of the property are input; and further displaying, on the preview pane of the user interface screen, a label for a first text block included in the image after the first text block is associated with at least one of the setting items displayed in the property pane, wherein the label indicates a number of the at least one of the setting items associated with the first text block.

11. A non-transitory computer readable storage medium storing a program for causing a computer to perform:

displaying a user interface screen for setting a property to an image, wherein the user interface screen includes a preview pane that is an area preview-displaying the image and a property pane that is an area to which setting values of setting items of the property are input; and further displaying, on the preview pane of the user interface screen, a label for a first text block included in the image after the first text block is associated with two or more of the setting items displayed in the property pane, wherein the label indicates a number of the two or more of the setting items associated with the first text block.

12. The non-transitory computer readable storage medium according to claim 11, wherein the program causes the computer to further perform:

coloring the first text block with a default color if the first text block is associated with the two or more of the setting items and any of the associated two or more of the setting items is not being in a selected state; and coloring, when a user selects one of the associated two or more of the setting items in the property pane, the first text block with a color corresponding to the selected one setting item.

13. The non-transitory computer readable storage medium according to claim 11, wherein the program causes the computer to further perform:

coloring, if a second text block in the image is associated with only one of the setting items, both of at least a part of a field of the associated only one of the setting items displayed in the property pane and the second text block in the image preview-displayed in the preview pane with a same or similar color.

14. The non-transitory computer readable storage medium according to claim 11, wherein the program causes the computer to further perform:

coloring, in a case where a user selects one of text blocks in the image preview-displayed in the preview pane in a selected state where one of the setting items which is not associated with any text block is selected in the property pane, the selected one text block with a color that is same as or similar to the color allocated to the selected one of the setting items being in the selected state.

15. A non-transitory computer readable storage medium storing a program for causing a computer to perform:

displaying a user interface screen for setting a property to an image, wherein the user interface screen includes a preview pane that is an area preview-displaying the image and a property pane that is an area to which setting values of setting items of the property are input; and further displaying, on the preview pane of the user interface screen, a label for a first text block included in the image after the first text block is associated with at least one of the setting items displayed in the property pane, wherein the label indicates a number of the at least one of the setting items associated with the first text block.

* * * * *